(12) United States Patent
Arvidsson et al.

(10) Patent No.: US 9,199,198 B2
(45) Date of Patent: Dec. 1, 2015

(54) METHOD AND A DEVICE PERTAINING TO THE SERVICE NEED OF A FILTER IN A SCR-SYSTEM'S LIQUID SUPPLY DEVICE (75) Inventors: Daniel Arvidsson, Värmdö (SE); Per Bremberg, Södertälje (SE); Andreas Liljestrand, Södertälje (SE)

(73) Assignee: SCANIA CV AB (SE)

( * ) Notice: Subject to any disclaimer, the term of this patent is extended or adjusted under 35 U.S.C. 154(b) by 284 days.

(21) Appl. No.: 13/642,939

(22) PCT Filed: Apr. 19, 2011

(86) PCT No.: PCT/SE2011/050476
§ 371 (c)(1),
(2), (4) Date: Nov. 29, 2012

(87) PCT Pub. No.: WO2011/142708
PCT Pub. Date: Nov. 17, 2011

(65) Prior Publication Data
US 2013/0078156 A1 Mar. 28, 2013

(30) Foreign Application Priority Data
Apr. 23, 2010 (SE) ...................................... 1050400

(51) Int. Cl.
*B01D 53/94* (2006.01)
*F01N 3/20* (2006.01)
*F01N 11/00* (2006.01)
*B23P 6/00* (2006.01)

(52) U.S. Cl.
CPC ............... *B01D 53/9431* (2013.01); *B23P 6/00* (2013.01); *F01N 3/2066* (2013.01); *F01N 11/00* (2013.01);

(Continued)

(58) Field of Classification Search
CPC ... F01N 3/2066; F01N 11/00; F01N 2250/05; F01N 2610/02; F01N 2610/1426; F01N 2610/14; Y02T 10/24; Y02T 10/47; B01D 53/9431; B23P 6/00
USPC ........................................ 700/266; 702/31, 32
See application file for complete search history.

(56) References Cited

U.S. PATENT DOCUMENTS 6,063,350 A * 5/2000 Tarabulski ............. B01D 53/90
423/212
2007/0240649 A1 10/2007 Freeman
(Continued)

FOREIGN PATENT DOCUMENTS

DE 20 2005 009 939 U1 10/2006
DE 10 2006 040 411 A1 3/2008
(Continued)

OTHER PUBLICATIONS

International Search Report dated Aug. 1, 2011 issued in corresponding international patent application No. PCT/SE2011/050476.

*Primary Examiner* — Shogo Sasaki
(74) *Attorney, Agent, or Firm* — Ostrolenk Faber LLP (57) ABSTRACT

Disclosed is a method pertaining to SCR systems for exhaust cleaning whereby liquid is supplied to a feed device via which it is supplied to a dosing unit at a consumption point of the SCR system. The method includes continuously determining cumulative amounts of liquid dosed via the dosing unit. Need for replacement or cleaning of a filter unit for said liquid is also determined on the basis of the cumulative amounts of liquid dosed. The method further includes dosing at least part of the liquid supplied via the feed device and feeding undosed liquid back in a return flow to enable it to be supplied again to the feed device. Also disclosed is a computer program product that includes code for a computer for implementing the disclosed method.

20 Claims, 4 Drawing Sheets

(52) U.S. Cl.
CPC ......... *F01N 2550/05* (2013.01); *F01N 2610/02* (2013.01); *F01N 2610/14* (2013.01); *F01N 2610/1426* (2013.01); *Y02T 10/24* (2013.01); *Y02T 10/47* (2013.01); *Y10T 137/0402* (2015.04)

(56) References Cited

U.S. PATENT DOCUMENTS

| | | | |
|---|---|---|---|
| 2010/0024390 A1* | 2/2010 | Wills | F01N 13/009 60/274 |
| 2010/0024397 A1* | 2/2010 | Chi | F01N 3/106 60/285 |
| 2010/0071349 A1* | 3/2010 | Kitazawa | F01N 3/2066 60/277 |
| 2010/0223908 A1* | 9/2010 | Solbrig | B01D 53/90 60/276 |
| 2010/0319316 A1* | 12/2010 | Kasahara | F01N 3/106 60/273 |

FOREIGN PATENT DOCUMENTS

| | | |
|---|---|---|
| EP | 2 131 021 A1 | 12/2009 |
| WO | WO 00/21881 | 4/2000 |
| WO | WO 2009/118325 A1 | 10/2009 |

* cited by examiner

METHOD AND A DEVICE PERTAINING TO THE SERVICE NEED OF A FILTER IN A SCR-SYSTEM'S LIQUID SUPPLY DEVICE

CROSS-REFERENCE TO RELATED APPLICATIONS

The present application is a 35 U.S.C. §§371 national phase conversion of PCT/SE2011/050476, filed Apr. 19, 2011, which claims priority of Swedish Application No. 1050400-9, filed Apr. 23, 2010, the contents of which are incorporated herein by reference. The PCT International Application was published in the English language.

TECHNICAL FIELD

The present invention relates to a method pertaining to SCR systems for exhaust cleaning whereby liquid is supplied to a feed device via which it is then supplied to a dosing unit at a consumption point of the SCR system. The invention relates also to a computer program product comprising program code for a computer to implement a method in accordance with the invention. The invention relates also to a device comprising an SCR system and to a motor vehicle which is equipped with the device.

BACKGROUND

Vehicles today use, for example, urea as a reductant in SCR (selective catalytic reduction) systems which comprise an SCR catalyst in which said reductant and NOx gas can react and be converted to nitrogen gas and water. Various types of reductants may be used in SCR systems. AdBlue is an example of a commonly used reductant.

One type of SCR system comprises a container which holds a reductant. The SCR system has also a pump arranged to draw said reductant from the container via a suction hose and to supply it via a pressurised hose to a dosing unit situated adjacent to an exhaust system of the vehicle, e.g. adjacent to an exhaust pipe of the exhaust system. The dosing unit is arranged to inject a necessary amount of reductant into the exhaust pipe upstream of the SCR catalyst according to operating routines which are stored in a control unit of the vehicle. To make it easier to regulate the pressure when there are small or no dosing amounts, the system may also have a return hose which runs back to the container from a pressure side of the system. According to this configuration it is possible to cool the dosing unit by means of the reductant which, during cooling, flows from the container via the pump and the dosing unit and back to the container. The dosing unit is thus provided with active cooling. The return flow from the dosing unit to the container may be substantially constant and is currently not controlled or regulated by means of purpose-made valves or such units.

The pump currently has a filter to filter the reductant before dosing via the dosing unit. This filter is provided to protect the dosing unit from becoming blocked by particles, e.g. soil particles, dirt etc. The filter may be a paper filter, but other kinds of filter may of course be used.

A service life of the filter is currently defined by suppliers of SCR systems as a predetermined cumulative distance travelled by the vehicle. It is recommended that an ordinary type of filter for the pump be replaced after 120,000 kilometers. A recommendation for commercial vehicles might be 80,000 km. In certain cases, these recommendations are implemented as a servicing operation for the respective vehicle, which means that service staff check on the occasion of a vehicle service how far it has travelled since the latest filter change, and replace said filter if the predetermined distance has been, or is close to being, reached.

There are various disadvantages of using a predetermined distance travelled as a measure of the degree of blockage of the filter.

One disadvantage is that applications where the SCR system doses more than average reductant during operation involve risk that the filter may become blocked before the vehicle has travelled the predetermined distance. This may cause impaired cooling of the dosing unit and consequent functional degradation and/or material destruction.

In cases of frequent use of applications where the vehicle's SCR system requires dosing of reductant despite the vehicle not being run and not accumulating distance travelled, the filter may likewise become blocked before the predetermined distance has been travelled.

In applications which dose less than an average, the predetermined distance may be too short, with the result that the filters actual service life is not fully utilised. This is negative from a cost perspective. It is also negative from a safety perspective through entailing increased risk of contamination of the reductant, and of the dosing system's actual components, on the occasion of filter replacement.

Another disadvantage of the state of the art is that using distance travelled as a basis for a replacement interval for the filter of the pump in the SCR system involves a quite considerable safety margin. This means that many filters are currently replaced too early, i.e. before replacement is really necessary. This is of course negative from a cost perspective.

It should also be noted that various applications of SCR systems are currently of a stationary nature, making it impossible to define a predetermined distance travelled as a key parameter for replacement intervals for the filter of the pump.

There is therefore a need to improve today's SCR systems by reducing or eliminating the above disadvantages.

SUMMARY OF THE INVENTION

An object of the present invention is to propose a novel and advantageous method pertaining to an SCR system.

Another object of the invention is to propose a novel and advantageous device comprising an SCR system for exhaust cleaning, and a novel and advantageous computer program pertaining to an SCR system.

A further object of the invention is to propose a method, a device and a computer program for achieving a variable replacement interval for a filter for a reducing agent of a feed device of an SCR system.

A further object of the invention is to propose a method, a device and a computer program for reducing risk that a filter for a reducing agent of a feed device of an SCR system might become blocked.

A further object of the invention is to propose a method, a device and a computer program for achieving in a cost-effective way improved performance of an SCR system, with optimised use of a filter for reducing agents of said SCR systems.

A further object of the invention is to propose a method, a device and a computer program for achieving in a cost-effective and user-friendly way an improved SCR system.

These objects are achieved with a method pertaining to SCR systems for exhaust cleaning according to the present invention.

An aspect of the invention proposes a method pertaining to SCR systems for exhaust cleaning whereby liquid is supplied to a feed device via which it is then supplied to a dosing unit at a consumption point of the SCR system, comprising the step of:

continuously determining cumulative amounts of liquid dosed via the dosing unit. The method further comprises steps of:

determining need for replacement or cleaning of a filter unit for said liquid on the basis of said cumulative amounts of liquid dosed;

dosing at least part of the liquid which is supplied via the feed device; and feeding undosed liquid back in a return flow to enable it to be supplied again to said feed device.

In a commonly used application of the SCR system, part of the liquid is used for dosing at said consumption point during operation of said system. The portion of the liquid which is not dosed is fed back in a return flow to enable it to be supplied again to said feed device. This portion of the liquid is with advantage used as cooling medium for the dosing unit. It should be noted that the liquid in the return flow is filtered and the SCR system thus to some extent becomes self-cleaning if the liquid is in a closed system. The filtered liquid fed back thus does not contribute to further blocking of the filter unit of the feed means. According to the invention, after allowing for the aforesaid cooling function for the dosing unit, it is only the cumulative amount of liquid dosed which serves as the basis for a replacement interval for the filter unit. According to the invention, the need to replace the filter unit of the feed device is determined not on the basis of the total flow of liquid in the SCR system or the cumulative distance travelled by the vehicle but on the basis of the actual dosing of liquid at said consumption point.

An aspect of the invention proposes a function for optimising a replacement interval for the filter unit on the basis of cumulative amounts dosed of reducing agent of an SCR system since the most recent filter unit replacement. A filter replacement may be followed by zeroing of a variable which denotes cumulative amounts of reducing agent dosed. This zeroing may be effected manually by, for example, service staff or an operator of the SCR system. It may alternatively be effected automatically as a result of appropriate configuration.

With advantage, the present invention contributes to avoidance of VORs (also called standstills) due to blockage of the filter unit, an undesirable state which entails a relatively large pressure drop across the filter unit, making it impossible for the feed device to build up a suitable pressure to the dosing unit. The present invention also reduces risk of the filter unit becoming totally blocked, which would cause throttling of liquid flow to the feed unit and thereby probably result in overheating.

An advantage of the present invention is that the replacement interval of the filter unit is optimised, making it possible for the filter unit to be replaced at an appropriate degree of blockage or an appropriate time.

An advantage of the present invention is that it reduces or minimises an extra cost associated with too early filter replacement caused by a fixed replacement interval for the filter of the feed device.

The method may further comprise the step of:

determining the need by comparing a value which represents cumulative amounts of liquid dosed with a predetermined value. This affords the advantage of an accurate and cost-effective way of determining whether the filter unit does or does not need replacing. The predetermined value may be an application-specific value. According to an example, the predetermined value is 1000 liters. According to another example, the predetermined value is 25,000 liters. According to a version, the predetermined value may be within a range of between 1,000 and 25,000 liters. The predetermined value may be chosen on the basis of a specific SCR system or on the basis of a certain vehicle which has an SCR system.

By comparing the value which represents cumulative amounts of liquid dosed and the predetermined value it is possible to determine whether the filter unit is likely to be blocked to such an extent as to need replacing in an immediate future, or whether its replacement can wait until a scheduled future service of the SCR system or of a vehicle provided with the SCR system.

The method may further comprise the step of determining the need on the basis of the amount of undosed liquid fed back. On the basis of amounts of liquid fed back by said return flow it is possible to define a better predetermined value for said comparison with the value which represents cumulative amounts of liquid dosed. The fact that the liquid fed back is already filtered results in a kind of self-cleaning of the liquid within the SCR system, allowing a longer replacement interval for said filter unit.

The method may further comprise the step of determining said cumulative amounts of liquid dosed on the basis of pressures of the liquid at said consumption point during at least one period of time when said liquid is being dosed. The result is a reliable and fairly accurate way of determining said cumulative amounts of liquid dosed. Pressure sensors for measuring pressures of said liquid are accurate and relatively inexpensive, resulting in a cost-effective procedure for optimising replacement intervals for said filter unit of the SCR system. The period of time which corresponds to the dosing time is application-specific. It may be a short period, e.g. 0.001 s, 0.01 s, 0.1 s or 1.0 second. It may also be a longer period, e.g. a number of seconds or a number of minutes. It may also be a number of hours. In a version in which dosing takes place continuously, one or more appropriate periods of time may be chosen.

The method may further comprise the step of determining said cumulative amounts of liquid dosed on the basis of a prevailing temperature of the liquid and/or a differential pressure between the liquid at said consumption point and an exhaust flow of said SCR system. This provides a way of determining said cumulative amounts of liquid dosed with further reliability and accuracy. It also results in a further refined procedure for optimising replacement intervals for said filter unit of the SCR system.

Said filter unit may be arranged detachably in said feed device. Said filter unit may be a paper filter placed in the feed device to filter and clean said liquid which is to be fed to the dosing unit. The filter unit may alternatively be arranged to filter said liquid in the SCR system externally to said feed device. The filter unit may according to an example be situated upstream of said feed device. The filter unit may according to an example be situated downstream of said feed device.

Said liquid may be a reducing agent, e.g. a urea-based reducing agent.

The method may further comprise the step, where need is determined, of activating an indicating configuration. This indicating configuration may be a light device for signalling that it is time to replace the filter unit of the SCR system. The light device may be situated adjacent to the SCR system or in a driving cab of a vehicle which is provided with said SCR system. According to an example, a red lamp lights up when said need is determined.

According to another example, an indicating configuration is activated in a control unit of the SCR system. In a version it may take the form of a flag in a computer program stored in the control unit to indicate when it is time to replace the filter unit of the SCR system. This flag may be detected by, for example, service staff on the occasion of servicing or inspection of the SCR system.

The method may further comprise the step, where need is determined, of manually replacing said filter unit by another filter unit, or of manually cleaning said filter unit.

An aspect of the present invention proposes a device comprising an SCR system for exhaust cleaning whereby liquid is supplied to a feed device which is arranged to supply it to a dosing unit at a consumption point of the SCR system. The device comprises means for continuously determining cumulative amounts of liquid dosed via the dosing unit. The device further comprises:

means for determining need for replacement of a filter unit for said liquid on the basis of said cumulative amounts of liquid dosed;

means for dosing at least part of the liquid supplied via the feed device; and means for feeding undosed liquid back in a return flow to enable it to be supplied again to said feed device.

The device may further comprise means for determining the need by comparing a value which represents cumulative amounts of liquid dosed with a predetermined value.

The device may further comprise means for determining the need on the basis of the amount of undosed liquid fed back.

The device may further comprise means for determining said cumulative amounts of liquid dosed on the basis of pressures of the liquid at said consumption point during at least one period of time when said liquid is being dosed.

The device may further comprise means for determining said cumulative amounts of liquid dosed on the basis of a prevailing temperature of the liquid and/or a differential pressure between the liquid at said consumption point and an exhaust flow of said SCR system.

Said filter unit may be arranged detachably in said feed device.

Said liquid may be a reducing agent, e.g. a urea-based reducing agent.

The device may further comprise, where need is determined, activation of an indicating configuration.

The above objects are also achieved with a motor vehicle which has the device according to an aspect of the invention. The vehicle may be any from among truck, bus or passenger car.

An aspect of the invention proposes a computer program for SCR systems for exhaust cleaning, which computer program comprises program code stored on a computer-readable medium for causing an electronic control unit or another computer connected to the electronic control unit to perform steps according to the present invention.

An aspect of the invention proposes a computer program product comprising a program code stored on a computer-readable medium for performing method steps according to the present invention when said computer program is run on an electronic control unit or another computer connected to the electronic control unit.

The method according to the invention is easy to implement in existing motor vehicles. Software for said method pertaining to an SCR system according to the invention may be installed in a control unit of the vehicle during the manufacture of the vehicle. A purchaser of the vehicle may thus have the possibility of choosing the function of the method as an option. Alternatively, software comprising program code for effecting the innovative method pertaining to an SCR system may be installed in a control unit of the vehicle on the occasion of upgrading at a service station, in which case the software may be loaded into a memory in the control unit. Implementing the innovative method is therefore cost-effective. Software which comprises program code for said method pertaining to an SCR system is easy to update or replace. Moreover, various portions of the software which comprise program code for said method pertaining to an SCR system may be replaced independently of one another. This modular configuration is advantageous from a maintenance perspective.

Further objects, advantages and novel features of the present invention will become apparent to one skilled in the art from the following details, and also by putting the invention into practice. Whereas the invention is described below, it should be noted that it is not confined to the specific details described. Specialists having access to the teachings herein will recognise further applications, modifications and incorporations in other fields, which are within the scope of the invention.

BRIEF DESCRIPTION OF THE DRAWINGS

For fuller understanding of the present invention and further objects and advantages thereof, the detailed description set out below should be read together with the accompanying drawings, in which the same reference notations denote similar items in the various diagrams, and in which.

DETAILED DESCRIPTION OF THE DRAWINGS

Figure 1:
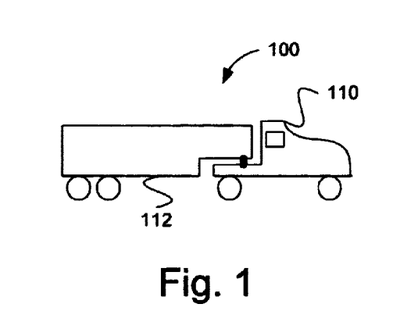
FIG. 1 illustrates schematically a vehicle according to an embodiment of the invention.

FIG. 1 depicts a side view of a vehicle 100. The exemplified vehicle 100 comprises a tractor unit 110 and a trailer 112. The vehicle may be a heavy vehicle, e.g. a truck or a bus. The vehicle may alternatively be a passenger car.

It should be noted that the invention is suitable for application in any SCR system and is therefore not confined to SCR systems of motor vehicle. The innovative method and the innovative device according to an aspect of the invention are well suited to other platforms which have an SCR system, e.g. watercraft. The watercraft may be of any kind, e.g. motor boats, steamers, ferries or ships.

The innovative method and the innovative device according to an aspect of the invention are also well suited to, for example, systems which comprise industrial engines and/or engine-powered industrial robots.

The innovative method and the innovative device according to an aspect of the invention are also well suited to various kinds of power plants, e.g. an electric power plant which comprises a diesel generator.

The innovative method and the innovative device are also well suited to any engine system which comprises an engine and an SCR system, e.g. on a locomotive or some other platform.

The innovative method and the innovative device are also well suited to any system which comprises an $NO_x$ generator and an SCR system.

The feed device herein described may be any feed device and need not be a diaphragm pump such as herein described.

The liquid of the SCR system may be any reducing agent, e.g. AdBlue.

The term "link" refers herein to a communication link which may be a physical connection such as an opto-electronic communication line, or a non-physical connection such as a wireless connection, e.g. a radio link or microwave link.

The term "line" refers herein to a passage for holding and conveying a fluid, e.g. a reductant in liquid form. The line may be a pipe of any desired size. The line may be made of any suitable material, e.g. plastic, rubber or metal.

The term "reductant" or "reducing agent" refers herein to an agent used for reacting with certain emissions in an SCR system. These emissions may for example be NOx gas. The terms "reductant" and "reducing agent" are herein used synonymously. Other kinds of reductants may of course be used. AdBlue is cited herein as an example of a reductant, but specialists will appreciate that the innovative method and the innovative device are feasible with other types of reductants, subject to necessary adaptations, e.g. adaptations to appropriate freezing points for chosen reductants, in control algorithms for executing software code in accordance with the innovative method.

Figure 2:
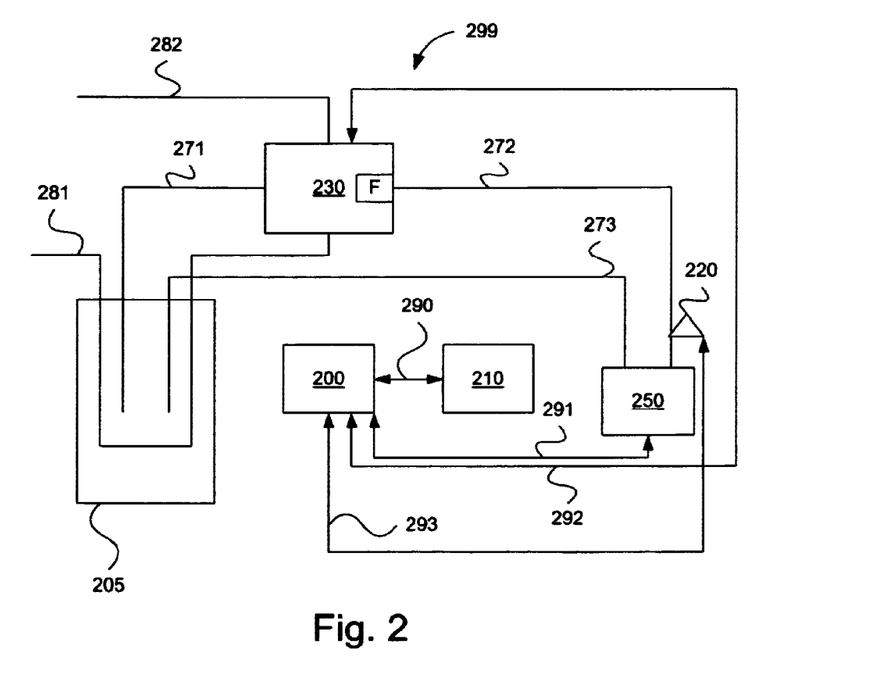
FIG. 2 illustrates schematically a subsystem for the vehicle depicted in FIG. 1, according to an embodiment of the invention.

FIG. 2 depicts a subsystem 299 of the vehicle 100. The subsystem 299 is situated in the tractor unit 110. The subsystem 299 may be part of an SCR system. The subsystem 299 comprises in this example a container 205 arranged to hold a reductant. The container 205 is adapted to containing a suitable amount of reductant and also to being replenishable as necessary. The container might accommodate, for example, 75 or 50 liters of reductant.

A first line 271 is adapted to leading the reductant to a pump 230 from the container 205. The pump 230 may be any suitable pump. The pump 230 may be a diaphragm pump.

The pump has a filter F. The filter F may be a main filter of the SCR system. According to a version, it is the filter F which is relevant for this invention.

The filter F is a filter of appropriate kind which may serve as a monitoring point during a service of the SCR system. The present invention relates to optimising a replacement interval for the main filter F.

According to an aspect of the invention, the filter F is cleaned instead of being replaced by new filter. The degree of obstruction is thus reduced to a minimum in that a filtering function of the cleaned filter F is substantially the same as a filtering function of an unused filter.

According to a version, further filters (not depicted) for filtering the reductant within the SCR system may be provided as appropriate. According to an example, a filter may be provided at an inlet to the first line 271 in the container 205. According to another example, a filter may be provided at an inlet to the pump 230. According to further example, a filter may be provided downstream of the pump 230.

According to an aspect of the invention, one or more of these filters may also be replaced or cleaned when a need to replace the filter F is determined on the basis of cumulative amounts of reducing agent dosed via the dosing unit 250.

According to an aspect of the invention, one or more of these filters may also be replaced or cleaned on the basis of cumulative amounts of reducing agent dosed via the dosing unit 250.

At least one of these further filters may thus be replaced or cleaned depending on whether the filter F needs replacing or cleaning. At least one of these further filters may be replaced or cleaned at the same as the filter F is replaced or cleaned.

These further filters may have mutually independent predetermined replacement intervals which depend on type of filter or some other characteristic of them.

It should be noted that the main filter F may be situated within the SCR system externally to pump 230, although the embodiment described with reference to FIG. 2 has the main filter situated in the pump 230.

The pump 230 is arranged to be driven by an electric motor. The pump 230 is adapted to drawing the reductant from the container 205 via the first line 271 and to supply said reductant to a dosing unit 250 via a second line 272. The dosing unit 250 comprises an electrically controlled dosing valve by which a flow of the reductant added to the exhaust system can be controlled. The pump 230 is arranged to pressurise the reductant in the second line 272. The dosing unit 250 is provided with a choke unit against which said pressure of the reductant is built up in the subsystem 299. This pressure is hereinafter called the working pressure of the SCR system.

The dosing unit 250 is adapted to supplying said reductant to an exhaust system (see FIG. 3) of the vehicle 100. More specifically, the dosing unit 250 is adapted to supplying a suitable amount of reductant in a controlled way to an exhaust system of the vehicle 100. In this version, an SCR catalyst (not depicted) is situated downstream of a location in the exhaust system where supply of the reductant takes place. The amount of reductant supplied in the exhaust system is intended to be used in a conventional way in the SCR catalyst in order to reduce in a conventional way the amount of undesirable emissions.

The dosing unit 250 is situated adjacent to, for example, an exhaust pipe which is provided to lead exhaust gases from a combustion engine (not depicted) of the vehicle 100 to the SCR catalyst. The dosing unit 250 is in thermal contact with the exhaust system of the vehicle 100. This means that thermal energy stored in, for example, an exhaust pipe, silencer and SCR catalyst can thus be transferred to the dosing unit.

The dosing unit 250 comprises an electronic control card adapted to handling communication with a control unit 200. The dosing unit 250 comprises also plastic and/or rubber components which might be melted or otherwise adversely affected by too high temperatures.

The dosing unit 250 is sensitive to temperatures above a certain value, e.g. 120 degrees Celsius. As, for example, the exhaust pipe, the silencer and the SCR catalyst of the vehicle 100 exceed this temperature value, there is risk that the dosing unit might overheat during or after operation of the vehicle if no cooling is provided for it. The main filter F described above becoming partly or completely blocked may result in reduced cooling effect upon the dosing unit 250, leading to said disadvantages associated with too high temperatures.

A third line 273 runs between the dosing unit 250 and the container 205. The third line 273 is intended to lead back to the container 205 the portion of the reductant which has not been dosed via the dosing unit 250. This configuration results in advantageous cooling of the dosing unit 250. The dosing unit 250 is thus cooled by a flow of the reductant when the latter is pumped through the dosing unit 250 from the pump 230 to the container 205.

A first coolant line 281 is adapted to holding and conveying coolant for an engine of the vehicle 100. The first coolant line 281 is partly situated in the container 205 in order to warm the reductant therein if the reductant is cooled. In this example, the first coolant line 281 is adapted to leading radiator liquid which has been warmed by the engine of the vehicle 100 back to the engine in a closed circuit through the container 205, via the pump 230 and a second radiator liquid line 282. According to a version, the first radiator liquid line 281 is configured with a substantially U-shaped portion situated in the container 205, as schematically depicted in FIG. 2. This configuration achieves improved warming of the reductant in the container 205 when the reductant is at too low a temperature to function as desired. It should be noted that the first coolant line 281 may be of any suitable configuration. If the reductant is at a temperature which exceeds a predetermined value, warming of the reductant by the radiator liquid is automatically deactivated.

A first control unit 200 is arranged for communication with a pressure sensor 220 via a link 293. The pressure sensor 220 is adapted to detect a prevailing pressure of the reductant at the location where the sensor is fitted. The pressure sensor 220 is adapted to detect a prevailing working pressure of the SCR system. According to this version, the pressure sensor 220 is situated adjacent to the second line 272 in order to measure a working pressure of the reductant downstream of the pump 230. The pressure sensor 220 is adapted to send continuously to the first control unit 200 signals which contain information about a prevailing pressure of the reductant.

The first control unit 200 is arranged for communication with the pump 230 via a link 292. The first control unit 200 is adapted to control operation of the pump 230 in order, for example, to regulate the flow of the reductant within the subsystem 299. The first control unit 200 is adapted to control an operating power output of the pump 230 by regulating the associated electric motor.

The first control unit 200 is adapted to determine a return flow to the container 205 from the dosing unit 250. This makes it possible to determine a need to replace the main filter F on the basis of the amount of undosed reductant fed back, according to an aspect of the invention. According to an aspect of the invention, a predetermined value which is compared with a value which represents cumulative amounts of reductant dosed in order to determine need to replace the main filter F is chosen and/or altered on the basis of the amount determined of undosed reductant fed back.

The first control unit 200 is arranged for communication with the dosing valve 250 via a link 291. The first control unit 200 is adapted to control operation of the dosing unit 250 in order, for example, to regulate supply of the reductant to the exhaust system of the vehicle 100. The first control unit 200 is adapted to control operation of the dosing unit 250.

The first control unit 200 is adapted to continuously determine cumulative amounts of reductant dosed. There are various ways in which this can be done.

According to a version, the first control unit 200 is adapted to use the signals received which contain a prevailing pressure of the reductant adjacent to the region of the pressure sensor 220 as a basis for determining need to replace the main filter F of the SCR system in accordance with an aspect of the innovative method. According to this example, the first control unit uses information which has been used for controlling a number of periods of time during which dosing of the reductant has taken place. As dosing times and prevailing pressures of the reductant adjacent to the dosing unit are therefore known, a cumulative amount of reductant dosed can be determined by the first control unit 200.

A second control unit 210 is arranged for communication with the first control unit 200 via a link 290. The second control unit 210 may be detachably connected to the first control unit 200. The second control unit 210 may be a control unit external to the vehicle 100. The second control unit 210 may be adapted to effect the innovative method steps according to the invention. The second control unit 210 may be used to cross-load software to the first control unit 200, particularly software for applying the innovative method. The second control unit 210 may alternatively be arranged for communication with the first control unit 200 via an internal network in the vehicle. The second control unit 210 may be adapted to perform functions substantially similar to the first control unit 200, e.g. on the basis of the signals received which contain a prevailing pressure of the reductant at the dosing unit 250. The innovative method may be applied by the first control unit 200 or the second control unit 210 or by both the first control unit 200 and the second control unit 210.

Figure 3:
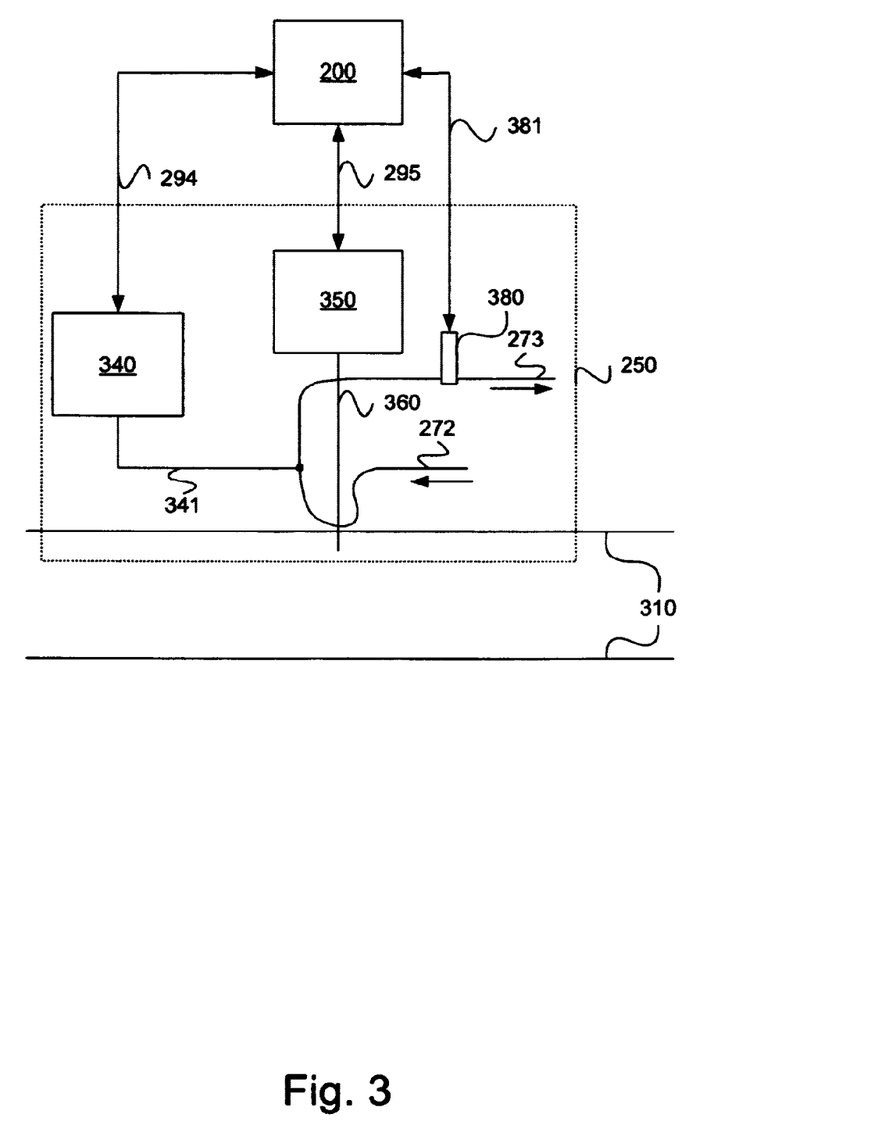
FIG. 3 illustrates schematically a subsystem for the vehicle depicted in FIG. 1, according to an embodiment of the invention.

FIG. 3 illustrates a subsystem which incorporates the dosing unit 250. It depicts the second line 272 and the third line 273.

In this version, the dosing unit 250 has a built-in pressure sensor 340 adapted to measuring a prevailing pressure of the reductant in a line 341 which is in flow communication with the third line 273. The pressure sensor 340 is adapted to send continuously to the first control unit 200 via a link 294 signals which contain information about a prevailing pressure of the reductant in the dosing unit 250.

The first control unit 200 is arranged for communication with a dosing unit 350 via a link 295. The dosing unit 350 is provided with a pin 360. The pin 360 is arranged for sliding in an exhaust pipe 310 of the SCR system, which exhaust pipe 310 is adapted to leading exhaust gases from an engine to surroundings of the SCR system. The dosing unit 350 is adapted to using signals received from the first control unit 200 via the link 295 as a basis for moving the pin 360 in a longitudinal direction of the pin in order to effect dosing into the exhaust pipe 310 of the reductant fed to the dosing unit 250.

The subsystem illustrated with reference to FIG. 3 comprises a temperature sensor 380 adapted to continuously determine a temperature of the reductant in the dosing unit 250. The temperature sensor 380 is arranged for communication with the first control unit 200 via a link 381. The temperature sensor 380 is adapted to continuously send to the first control unit 200 signals which contain information about a prevailing temperature of the reductant in the SCR system. The first control unit 200 is adapted to determine a cumulative amount of reductant dosed, on the basis of a prevailing temperature of the reductant, according to an aspect of the invention. The temperature of the reductant which is dosed can be used to determine more accurately a cumulative amount of reductant dosed, since various characteristics of the reductant are temperature-dependent, e.g. volume and viscosity. It should be noted that said temperature sensor 380 may be situated at any suitable location in the SCR system and not necessarily in the dosing unit 250.

According to an alternative embodiment, the dosing unit 250 comprises a flow sensor (not depicted) for continuously determining a prevailing mass flow for the portion of the reductant which is dosed into the exhaust pipe 310. This flow sensor is adapted to continuously send via a link to the first control unit 200 signals which contain information about a prevailing mass flow for the portion of the reductant which is dosed into the exhaust pipe 310. The first control unit 200 is thus adapted to continuously determine a cumulative amount of reductant dosed of the dosing unit 250, according to an aspect of the invention.

According to an aspect of the invention, a pressure sensor (not depicted) is provided in the exhaust pipe 310. This pressure sensor is arranged for communication with the first control unit 200 via a link. This pressure sensor is adapted to continuously sending to the first control unit 200 signals which contain information about a prevailing exhaust pressure in the exhaust pipe 310. The first control unit 200 is adapted to determine a cumulative amount of reductant dosed, on the basis of a differential pressure between the reductant in the third line 273 and an exhaust flow of said exhaust pipe 310.

Figure 4A:
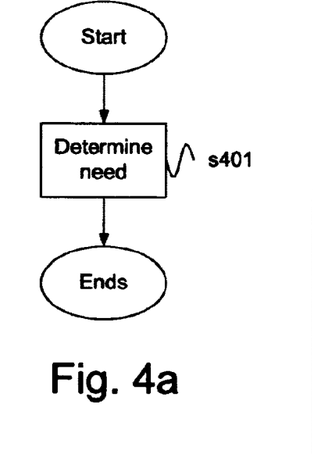
FIG. 4a is a schematic flowchart of a method according to an embodiment of the invention.

FIG. 4*a* illustrates schematically a flowchart of a method pertaining to SCR systems for exhaust cleaning whereby liquid is supplied to a feed device via which it is then supplied to a dosing unit at a consumption point of the SCR system, according to an embodiment of the invention. The method comprises a first step s401. Step s401 comprises the step of continuously determining cumulative amounts of liquid dosed via the dosing unit. Step s401 also comprises the step of determining need for replacement or cleaning of a filter unit for said liquid on the basis of said cumulative amounts of liquid dosed. Step s401 further comprises the steps of dosing at least part of the liquid supplied by the feed device, and feeding undosed liquid back in a return flow to enable it to be supplied to said feed device. The method ends after step s401.

Figure 4B:
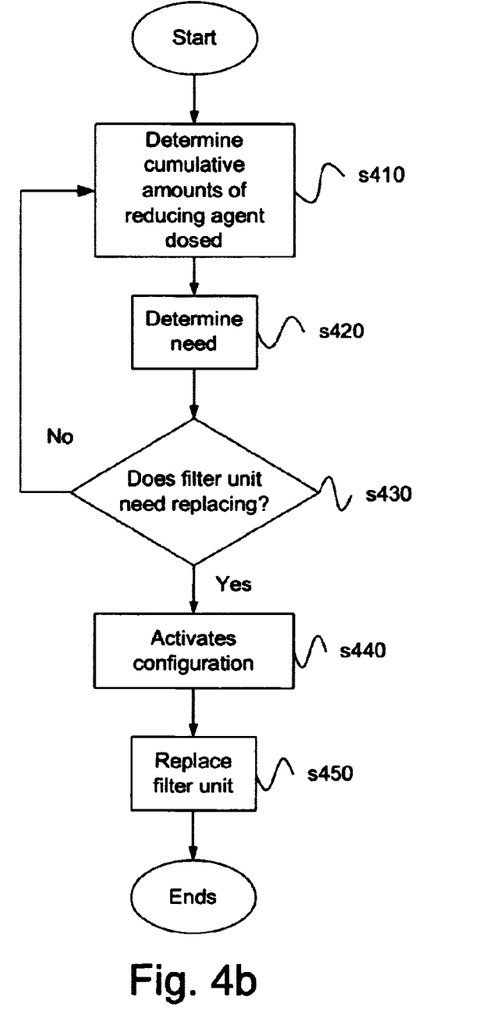
FIG. 4b is a more detailed schematic flowchart of a method according to an embodiment of the invention.

FIG. 4*b* illustrates schematically a flowchart of a method pertaining to SCR systems for exhaust cleaning whereby reducing agent is supplied to a feed device via which it is then supplied to a dosing unit at a consumption point of the SCR system, according to an embodiment of the invention.

The method comprises a first step s410. Step s410 comprises the step of continuously determining cumulative amounts of reducing agent dosed. There are various possible ways in which this may be done. In one example, cumulative amounts of reducing agent dosed may be determined by means of a flow sensor adapted to measure a mass flow of reductant which is dosed into an exhaust system of the SCR system. In another example, cumulative amounts of reducing agent dosed may be calculated by, for example, the first control unit 200. These calculations may be based on pressures of the reductant at the dosing unit 250 during at least one period of time when said reducing agent is being dosed into an exhaust system of the SCR system. These calculations may alternatively be based on a prevailing temperature of the reductant and/or a differential pressure between the reductant in the dosing unit 250 and an exhaust flow of said SCR system. Step s410 is followed by a step s420.

Method step s420 comprises the step of determining need for replacement or cleaning of the filter F for said liquid on the basis of a cumulative amount of reducing agent dosed. The step of determining the need may be performed by comparing a value which represents cumulative amounts of reducing agent dosed with a predetermined value. In one version, need for replacement or cleaning of the filter F is determined if the value which represents cumulative amounts of reducing agent dosed exceeds the predetermined value. In another version, need for replacement or cleaning of the filter F is determined if the value which represents cumulative amounts of reducing agent dosed is within a predetermined range. This predetermined range may be chosen on the basis of the particular kind of SCR system to which the invention is to be applied. Step s420 is followed by a step s430.

Method step s430 comprises the step of determining whether it is appropriate to replace or clean the filter F of the SCR system immediately or whether the replacement can wait for some time. Step s430 is performed on the basis of the preceding step s420. If it is not appropriate to replace the filter F, step s410 is performed again. If it is appropriate to replace the filter F, a subsequent step s440 is performed.

Method step s440 comprises the step of activating an indicating configuration to inform, for example, an operator of the SCR system if it is time to replace the filter F of the SCR system. Various kinds of indicating configurations are described above. Step s440 is followed by a step s450.

Method step s450 comprises the step of manually replacing or cleaning the filter F of said SCR system. After the filter F has been replaced by a corresponding new and unused filter F, or after the existing filter F has been cleaned, a value which represents the cumulative amount of reducing agent dosed may be zeroed. This may for example be done by acting upon the first control unit 200. After zeroing of the value which represents the cumulative amount of reducing agent dosed, its count may be restarted in order to optimise a replacement interval for the new or cleaned filter F. The method ends after step s450.

Figure 5:
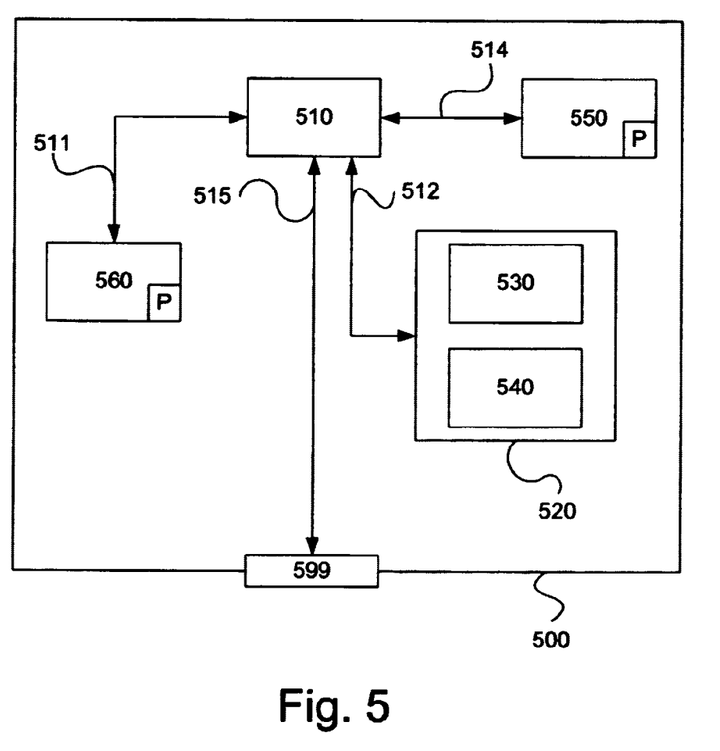
FIG. 5 illustrates schematically a computer according to an embodiment of the invention.

FIG. 5 is a diagram of a version of a device 500. The control units 200 and 210 described with reference to FIG. 2 may in a version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 200. The device 500 further comprises a bus controller, a serial communication port, I/O means, an A/D converter, a time and date input and transfer unit, an event counter and an interruption controller (not depicted). The non-volatile memory 520 has also a second memory element 540.

A computer program P is provided and comprises routines for continuously determining cumulative amounts of liquid dosed via the dosing unit. The computer program P comprises routines for determining need for replacement or cleaning of a filter unit for said liquid on the basis of said cumulative amounts of liquid dosed. The computer program P comprises routines for dosing at least part of the liquid supplied by the feed device, while undosed liquid is fed back in a return flow from the dosing unit to enable it to be supplied again to said feed device. The program P comprises routines for determining the need by comparing a value which represents cumulative amounts of liquid dosed with a predetermined value. The program P comprises routines for determining the need on the basis of the amount of undosed liquid fed back. The program P may be stored in an executable form or in compressed form in a memory 560 and/or in a read/write memory 550.

Where it is stated that the data processing unit 510 performs a certain function, it means that the data processing unit 510 effects a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is arranged to communicate with the data processing unit 510 via a data bus 514. The links 290, 291, 292, 293, 294 and 295, for example, may be connected to the data port 599 (see FIG. 2 and FIG. 3).

When data are received on the data port 599, they are stored temporarily in the second memory element 540. When input data received have been temporarily stored, the data processing unit 510 will be ready to effect code execution in a manner described above. In one version, signals received on the data port 599 contain information about prevailing temperatures of the reductant in or adjacent to the dosing unit 250. In one version, signals received on the data port 599 contain information about prevailing pressure of the reductant in or at the dosing unit 250. In one version, signals received on the data port 599 contain information about a prevailing mass flow for the reductant of the dosing unit 250 which is dosed into the exhaust system of the SCR system. The signals received on the data port 599 may be used by the device 500 to calculate a cumulative amount of reductant dosed of the SCR system. The signals received on the data port 599 may be used by the device 500 to determine need for replacement or cleaning of a filter unit for said liquid on the basis of said calculated cumulative amount of reductant dosed of the SCR system.

Parts of the methods herein described may be effected by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive, nor to limit the invention to the variants described. Many modifications and variants will obviously suggest themselves to one skilled in the art. The embodiments have been chosen and described in order best to explain the principles of the invention and the practical applications thereof and thereby make it possible for specialists to understand the invention for various embodiments and with the various modifications appropriate to the intended use.

The invention claimed is:

1. A method pertaining to an SCR system for exhaust cleaning whereby a liquid is supplied from a container to a feed device via which it is then supplied to a dosing unit located adjacent to a consumption point of an exhaust pipe of the SCR system or back to the container and said liquid is filtered by a filter unit while the liquid is supplied to the dosing unit, comprising:
   dosing, by the dosing unit, at least part of the liquid supplied via the feed device to the consumption point of the exhaust pipe, the dosing being controlled by a control unit;
   feeding, by a return line, any part of the liquid not dosed by the dosing unit back in a return flow to the container to enable said liquid to be supplied again to said feed device, the feeding being controlled by the control unit;
   continuously determining, by the control unit, cumulative amounts of the liquid dosed via the dosing unit;
   determining a need, by the control unit, for replacement or cleaning of the filter unit to filter said liquid on the basis of said cumulative amounts of the liquid dosed and notifying the need, by the control unit, for replacement or cleaning of the filter unit.

2. The method according to claim 1, further comprising the step of:
   determining, by the control unit, the need by comparing a value which represents the cumulative amounts of liquid dosed with a predetermined value.

3. The method according to claim 2, further comprising the step of:
   determining, by the control unit, the need on the basis of the amount of any part of the liquid not dosed by the dosing unit, the amount of any part of the liquid not dosed by the dosing unit being used by the control unit to choose, alter, or both choose and alter the predetermined value.

4. The method according to claim 1, further comprising the step of:
   determining, by the control unit, said cumulative amounts of liquid dosed, on the basis of pressures of the liquid in or adjacent to the dosing unit during at least one period of time when said liquid is being dosed.

5. The method according to claim 1, further comprising the step of:
   determining, by the control unit, said cumulative amounts of liquid dosed, on the basis of a prevailing temperature of the liquid at any selected location in said SCR system and/or a differential pressure between the liquid in or adjacent to the dosing unit and an exhaust flow of said exhaust pipe.

6. The method according to claim 1, in which said filter unit is placed detachably in said feed device.

7. The method according to claim 1, wherein said liquid is a reducing agent.

8. The method according to claim 1, further comprising the step of:
   activating, by the control unit, a notification device or method where the need is determined.

9. The method according to claim 1, further comprising the step of:
   where the need is determined, manually replacing said filter unit by another filter unit, or manually cleaning said filter unit.

10. A device comprising:
    an SCR system for exhaust cleaning comprising an exhaust pipe;
    a container to hold a liquid;
    a feed device to which the liquid is supplied from the container;
    a dosing unit located adjacent to a consumption point of the exhaust pipe of the SCR system, the dosing unit being supplied with at least part of the liquid by the feed device to dose the at least part of the liquid to the consumption point of the exhaust pipe;
    a return line which feeds any part of the liquid not dosed by the dosing unit in a return flow to the container to enable said liquid to be supplied again to said feed device;
    a filter unit, which is located between the container and the dosing unit, to filter the liquid; and
    a control unit configured to:
    control the dosing unit to dose the at least part of the liquid to the consumption point of the exhaust pipe;
    control feeding, by the return line, of any part of the liquid not dosed by the dosing unit in a return flow to the container to enable said liquid to be supplied again to said feed device;
    continuously determine cumulative amounts of liquid dosed by the dosing unit,
    determine a need for replacement or cleaning of the filter unit on the basis of said cumulative amounts of liquid dosed and notifying the need for replacement or cleaning of the filter unit.

11. The device according to claim 10, wherein the control unit is further configured to determine the need by comparing a value which represents the cumulative amounts of liquid dosed with a predetermined value.

12. The device according to claim 11, wherein the control unit is further configured to determine the need on the basis of the amount of any part of the liquid not dosed by the dosing unit, the amount of any part of the liquid not dosed by the dosing unit being used by the control unit to choose, alter, or both choose and alter the predetermined value.

13. The device according to claim 10, wherein the control unit is further configured to determine said cumulative amounts of liquid dosed, on the basis of pressures of the liquid in or adjacent to the dosing unit during at least one period of time when said liquid is being dosed.

14. The device according to claim 10, wherein the control unit is further configured to determine said cumulative amounts of liquid dosed, on the basis of a prevailing temperature of the liquid at any selected location in said SCR system and/or a differential pressure between the liquid in or adjacent to the dosing unit and an exhaust flow of said exhaust pipe.

15. The device according to claim 10, wherein said filter unit is placed detachably in said feed device.

16. The device according to claim 10, wherein the control unit is further configured to activate a notification device or method where the need is determined.

17. A system comprising a motor vehicle and the device according to claim 10, the motor vehicle comprising a tractor unit or chassis, the device being located in the tractor unit or chassis.

18. The system according to claim 17, wherein the motor vehicle is selected from a group consisting of a truck, a bus, and a passenger car.

19. A computer program pertaining to SCR systems for exhaust cleaning stored on a non-transitory computer-readable medium, which computer program comprises program code for causing: (1) the control unit of claim 1 to perform or control the performance of steps according to claim 1 or (2) a computer connected to the control unit of claim 1 to cause the control unit of claim 1 to perform or control the performance of steps according to claim 1.

20. A system comprising an electronic control unit and a computer program product comprising a program code stored on a non-transitory computer-readable medium for performing or controlling the performance of method steps according to claim 1, wherein the computer program product is run on the electronic control unit or on another computer connected to the electronic control unit.

\* \* \* \* \*